United States Patent [19]

Rashleigh

[11] Patent Number: 4,491,413

[45] Date of Patent: Jan. 1, 1985

[54] FIBER OPTIC GYROSCOPE WITH ALTERNATING OUTPUT SIGNAL

[75] Inventor: Scott C. Rashleigh, Alexandria, Va.

[73] Assignee: The United States of America as represented by the Secretary of the Navy, Washington, D.C.

[21] Appl. No.: 370,755

[22] Filed: Apr. 22, 1982

[51] Int. Cl.³ .......................... G01C 19/64; G01B 9/02
[52] U.S. Cl. .................................................... 356/350
[58] Field of Search ......................................... 356/350

[56] References Cited

U.S. PATENT DOCUMENTS

| | | | |
|---|---|---|---|
| 3,512,890 | 5/1970 | McLaughlin | 356/350 |
| 4,248,535 | 2/1981 | Pircher | 356/350 |
| 4,281,930 | 8/1981 | Hutchings | 356/350 |
| 4,420,258 | 12/1983 | Burns et al. | 356/350 |

OTHER PUBLICATIONS

Rashleigh et al., "Alternating Current Operation of the Dual Input Fiber-Optic Gyroscope", Conference, IOOC, '81, Third International Conference on Integrated Optics & Optical Fiber Comm., (Apr. 27-29, 1981).

"Fiber-Optic Rotation Sensing With Low Drift", Ulrich, Optics Letters, vol. 5, #5, May 1980, pp. 173–175.
Fiber Interferometer Gyroscope, M. N. McLandrich and H. E. Rast, SPIE, vol. 157, Laser Inertial Rotation Sensors, (1978).
Lichtleitfaser-Rotationssensor auf der Grundlage des Sagnac-Effekts Siemens Forsch.-u. Entwickl.-Ber. Bd. 9, (1980), Nr. 1, G. Schiffner.

*Primary Examiner*—Vincent P. McGraw
*Attorney, Agent, or Firm*—Robert F. Beers; William T. Ellis; Charles E. Krueger

[57] ABSTRACT

A Sagnac rotation sensing interferometer that uses a Mach-Zehnder interferometer to provide incident light beams that counter-propagate through an optical-fiber loop. The Sagnac interferometer operates at maximum sensitivity for zero rotation rates when the Mach-Zehnder is adjusted so that the intensities of the incident light beams are equal. By peiodically varying the position of a mirror in the Mach-Zehnder the interferometer is switched into and out of quadrature so that the amplitude of the interferometer output signal is modulated at frequency $f_o$. Phase sensitive detection at $2f_o$ or multiples thereof reduces the background noise level several orders of magnitude below the level for dc operation.

14 Claims, 11 Drawing Figures

DC OPERATION

FIG.5a

AC OPERATION

FIBER OPTIC GYROSCOPE WITH ALTERNATING OUTPUT SIGNAL

BACKGROUND OF THE INVENTION

The present invention relates generally to Sagnac fiber-optic rotation-sensing interferometers, and more particularly to a Sagnac fiber-optic rotation-sensing interferometer which produces an alternating output signal.

The Sagnac ring interferometer, which employs a long single-mode-optical-fiber loop, has shown promise as a passive gyroscope for navigational purposes. The properties of Sagnac fiber-optic gyroscopes are described in an article by Rashleigh and Burns entitled "Dual-Input Fiber-Optic Gyroscope", Optics Letters, Vol. 5, No. 11, p. 482, Nov. 1980. Typical Sagnac fiber-optic gyroscopes include means for introducing counter-propagating light beams into both ends of a fiber-optic loop and photodectors for measuring the intensities of the output light beam. This intensity detection then gives a measure of the relative phase shift between the counterpropagating beams in the fiber-optic loop in order to determine the rate of rotation about an axis perpendicular to the plane of the fiber-optic loop. An optical coupler/divider splits an incoming light beam into the counter propagating beams in the fiber-optic loop and later combines the output light beam exiting the fiber-optic loop, allowing them to interfere.

Two problems associated with the operation of typical interferometers are low sensitivity at near-zero rotation rates and the effect of noise on intrinsic dc operation.

Recently several interferometers have been developed which operate at maximum sensitivity, or quadrature, for near-zero rotation rates. However, these devices produce a dc signal which limits sensitivity due to high intrinsic, low-frequency noise levels in the photodetectors.

Since noise generally has a broad power spectrum, the power of the noise at a given frequency, for example $f_o$, is low. If the output signal is periodically varied at $f_o$ and amplified by a phase-locked amplifier, then much of the noise is eliminated and an improvement of several orders of magnitude in the sensitivity of the interferometer is achieved. Also, since noise is superimposed upon the output signal, it is desirable to achieve a signal of high average power in order to maximize the signal to noise ratio and to minimize loss of sensitivity.

Several methods of producing an alternating output signal from an interferometer have been developed whereby the intensity of the input beam to the interferometer is periodically varied. However, since power is switched into and out of the interferometer the average power level of the output signal is low and sensitivity is not maximized.

OBJECTS OF THE INVENTION

Accordingly, one object of this invention is to provide a novel Sagnac rotation-sensing interferometer having maximum sensitivity at near-zero rotation rate while producing an alternating output signal.

A further object is to provide a Sagnac rotation-sensing interferometer that produces a periodically varying output signal with a high average power level so that the signal to noise ratio is high.

SUMMARY OF THE INVENTION

Accordingly, the above and other objects are realized in the present invention comprising a new and improved Sagnac interferometer including means for switching the interferometer into and out of quadrature by varying the phase of the light beams in the interferometer thereby producing an alternating interferometer output signal. Since no input power is switched out of the interferometer, the average power of the output signal at the photodetectors is not reduced thereby assuring high sensitivity due to the high signal to noise ratio. The interferometer output signal is processed by a phase-locked amplifier to produce a final output signal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is a set of graphs relating to the operation of the interferometer when the value of $\theta$ varies periodically. The time axes of all the graphs are drawn to the same scale with a common origin.

FIG. 5 is a graphical depiction of the output signals, representing $\Omega$ vs. time, of an actual embodiment of the present invention.

DESCRIPTION OF THE PREFERRED EMBODIMENT

The present invention produces a low-noise electrical signal that is a function of the rate of rotation, $\Omega$, about a given axis. Prior art rotation sensing interferometers have been developed that operate a quadrature, the maximum sensitivity point, when $\Omega = 0$ but those Sagnac interferometers produce a dc signal with an inherently low signal to noise ratio.

Briefly stated the present invention modulates the intensities, $I_3$ and $I_4$, of the output beams of a prior art Sagnac interferometer by switching the interferometer into and out of quadrature; electronically measures the intensities, $I_3$ and $I_4$, and processes the resulting signals into the form $S_I=(I_3-I_4)/(I_3+I_4)$; and provides for phase-sensitive detection, at the modulation frequency of $S_I$ or multiples thereof. The resulting detected signal, $S_F$, exhibits a signal-to-noise ratio several orders of magnitude greater than prior art devices.

The application of the principles of the present invention to three prior art Sagnac rotation-sensing interferometers is set out below.

Figure 1:
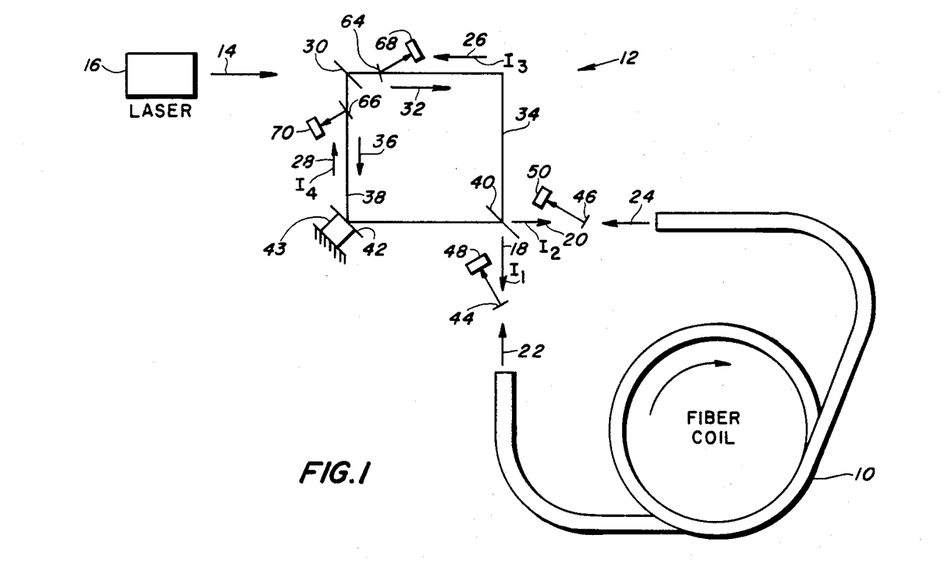
FIG. 1 depicts a prior art Sagnac rotation-sensing interferometer disclosed in U.S. patent application Ser. No. 314,298, now U.S. Pat. No 4,420,258, by Burns and Rashleigh which operates at quadrature, or maximum sensitivity, for near-zero rotation rates.
Figure 2:
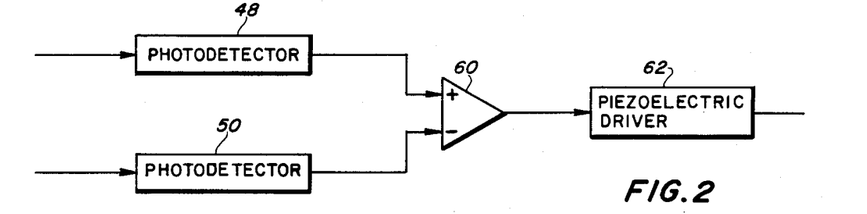
FIG. 2 is a schematic diagram of a circuit for adjusting the variable path length difference of the interferometer depicted in FIG. 1 to achieve maximum sensitivity at zero rotation rate.

Referring now to the drawings, wherein like reference numerals designate identical or corresponding parts throughout the several views, and more particularly to FIG. 1 thereof, a prior art interferometer that operates in quadrature, when controlled by the circuit of FIG. 2, is depicted.

The Sagnac interferometer of FIG. 1 comprises an optical light path circuit 10, such as a coil of single-mode optical fiber, and an optical coupler including a Mach-Zehnder interferometer 12. The optical coupler divides an input beam 14 from a light source 16 into two incident beams 18, 20 that counterpropagate through the optical light path circuit and combines the Sagnac phase shifted output beams 22, 24 to produce beams 26, 28 with intensities that are a function of the Sagnac phase shift.

The circuit of FIG. 2 is interconnected with and adjusts the Mach-Zehnder so that the Sagnac interferometer is in quadrature, notwithstanding the presence of air current in the Mach-Zehnder.

More specifically, an input light beam 14 is split by a first beamsplitter 30 into a first input beam component 32 which propagates along a first light path 34 and a second input beam component 36 which propagates along a second light path 38. The light paths 34, 38 include mirrors for directing the input beam components to a second beamsplitter 40 which splits the first input beam component into a third input beam component and fourth input beam component and splits the second input beam component into a fifth and a sixth input beam component. The third and fifth input beam components combine to form a first incident beam 18 of intensity $I_1$, which propagates through an optical light path circuit 10 in a counterclockwise direction while the fourth and sixth input beam components combine to form a second incident beam 20, of intensity $I_2$, which propagates through the optical light path circuit 10 in a clockwise direction.

The normalized intensities of the incident beams 18, 20 are:

$$I_{1,2} = \tfrac{1}{2}(1 \pm \cos\theta) \tag{1}$$

where $\theta$ the is the relative phase difference between the first and second input beam components and where $\theta$ is the sum of $\psi$, the phase difference introduced by the first beam splitter 30, and $\delta$, the phase difference caused by the relative path length difference between the first and second light paths 34, 38. Note that $I_1 = I_2 = \tfrac{1}{4}$ when $\theta = \pi/2$ and the Sagnac interferometer is in quadrature.

The light beam in the first light path 34 is directed from the first beamsplitter 30 to the second beamsplitter 40 by an adjustable mirror 42. By controlling the position of the adjustable mirror to very the relative path length difference, $\delta$ is adjusted so that $\theta = \delta + \psi = \pi/2$, $I_1 = I_2 = \tfrac{1}{4}$, and the Sagnac interferometer is in quadrature. The adjustment of the relative path length difference is achieved by mounting the adjustable mirror on a piezoelectric cylinder 43 which is driven to change the position of the adjustable mirror 42.

Beamsplitters 44, 46 are disposed to pick-off a small portion of the first and second incident beams 18, 20 so that the intensities, $I_1$ and $I_2$ may be measured by photodetectors 48, 50. The resulting voltage signals from these two detectors may be compared and utilized to produce a compensating voltage for driving the piezoelectric cylinder to adjust the phase shift, $\delta$, so that $I_1 = I_2$.

In this air-mirror design, air currents tend to change the optical path lengths in the interferometer. Accordingly, continuous adjustment of the phase shift, $\delta$, is typically necessary. In order to implement such a continuous adjustment of the phase shift, the circuit of FIG. 2 is set forth. The detectors 48 and 50 merely direct their voltage outputs to the inputs of a differential amplifier 60. The compensating voltage output from this differential amplifier is then applied to control the piezoelectric driver 62 for the mirror 42. In this manner, the intensities of the incident beams upon the ends of the light path circuit 10, $I_1$ and $I_2$, are automatically adjusted to be equal and to remain so.

The incident light beams counterpropagate through the optical light path circuit 10 and exit therefrom as first and second output beams 22, 24. The first output beam 22 is split by the second beamsplitter 40 into a third output beam component that propagates through the first light path 34 and a fourth output beam component that propagates through the second light path 38. Likewise, the second output beam is split into fifth and sixth components that propagate through the first and second light paths 34, 38 respectively. The third and fourth output beam components in the first light path 34 combine to form a third output beam 26 of intensity $I_3$ while the fourth and sixth output beam components in the second light path combine to form a fourth output beam 28 of intensity $I_4$.

The normalized intensities of the output beams, $I_3$ and $I_4$, after propagating through the optical light path circuit 18, which rotates at angular velocity, are:

$$I_{3,4} = \tfrac{1}{2}(1 \pm \sin\theta \sin 2\phi) \tag{2}$$

where $$2\phi = 8\pi NA\Omega/\lambda c \tag{3}$$

$\Omega$ being the rotation rate about the axis perpendicular to the plane of the optical light path circuit, NA being the total area enclosed by the optical light path circuit 10, and c being the free-space wavelength and the light-velocity, respectively, of the input beam.

Beamsplitters 64, 66 are positioned in the first and second light paths 34, 38 to pick off portions of the third and fourth output beams 26, 28 and direct the picked-off beams to photodetectors 68, 70. Signals are produced by the photodetectors 68, 70 proportional to $I_3$ and $I_4$.

Note that when $\theta = \pi/2$ eq. (3) becomes:

$$I_{3,4} = \tfrac{1}{2}(1 \pm \sin 2\phi) \tag{4}$$

and if $\Omega = 0$ then $I_3 = I_4$ so that the interferometer operates at quadrature, or maximum sensitivity.

The noise and minimum-detectable rotation rate are of particular importance in any fiber-optic gyroscope. Electronic processing of the detected signals in the form $$S_I = (I_3 - I_4)/(I_3 + I_4) = \sin\theta \sin 2\phi) \quad (5)$$

where $S_I$ is designated the interferometer output signal, removes the dependence of the gyroscope output signal on laser power fluctuations. When $\theta = \pi/2$, $S_I = \sin 2\phi$ and $\Omega$ may be calculated utilizing eq. (3).

It is to be noted that $S_I$ is a dc signal subject to intrinsic dc noise limitations.

The physical principles underlying the operation of the present invention can be understood by examining eqs. (1) and (2). As described above, $\delta$ may be changed by varying the relative path length difference between the first and second light paths of the Mach-Zehnder interferometer. Adjusting $\delta$ so that $\theta = \pi/2$ by means of a piezoelectric driver 84 brings the gyroscope into quadrature so that $I_1 = I_2 = \frac{1}{2}$ and $S_I = \sin 2\phi$. However, if the relative path length difference is adjusted so that $\theta = 0$ or $\pi$, the gyroscope is completely out of quadrature, and its sensitivity is zero with $I_1 = 1$, $I_2 = 0$, $I_3 = I_4 = \frac{1}{2}$, and $S_I = 0$, independently of any rotation. In this case, light travels in one direction only in the optical light path circuit 10.

The alternating interferometer output signal of the present invention is produced by periodically varying the adjustable path length difference so that $\theta$ switches from $\pi/2$ to 0 or $\pi$. Thus, the Sagnac interferometer is switched into and out of quadrature and the amplitude of the interferometer output signal, $S_I$, is modulated between $\sin 2\phi$ and 0 at frequency $f_o$. The modulated interferometer output signal is then processed by a phase locked amplifier at twice the modulation frequency or multiples thereof to provide a final output signal, $S_F = \sin 2\phi$, with a high signal-to-noise ratio. Since power is not switched out of the Sagnac interferometer to achieve ac modulation the average power in the photodetectors is high thereby further increasing the signal-to-noise ratio.

Figure 3:
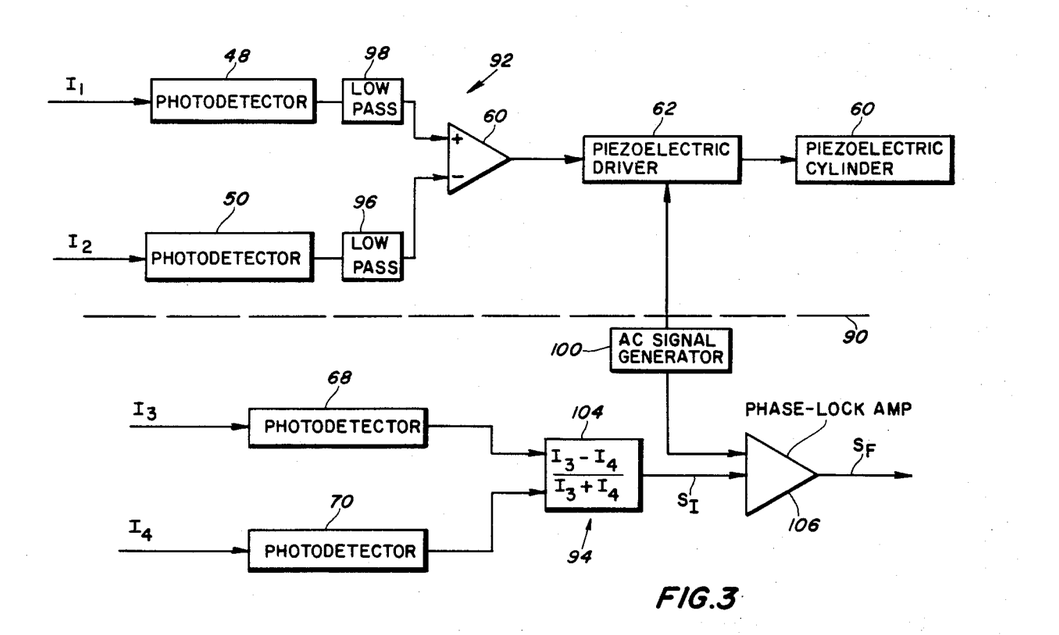
FIG. 3 is a schematic diagram of a circuit for alternating the output signals of the Sagnac interferometer, depicted in FIG. 1., and for providing phase-sensitive detection thereof.

A detailed description of the operation of an embodiment of the present invention comprising the dual input interferometer of FIG. 1 controlled by the circuit of FIG. 3 follows. FIG. 3 depicts a circuit for switching the interferometer of FIG. 1 into and out of quadrature.

More specifically, FIG. 3 is a schematic diagram depicting a circuit for cancelling low frequency phase fluctuations that would cause $I_1$ and $I_2$ to be unequal, for creating a high frequency amplitude modulation of $S_I$, and for phase sensitive detection of $S_I$ to provide a low-noise, final output signal $S_F = \sin 2\phi$.

In order to facilitate description of the operation of the circuit of FIG. 3 a dashed line 90 divides FIG. 3 into two parts; the upper part is designated the dc circuit 92 and the lower part the ac circuit 94. The dc circuit performs substantially the same function as the circuit depicted in FIG. 2, i.e., to sample $I_1$ and $I_2$ and cancel phase fluctuations between the input beam components that cause $I_1$ and $I_2$ to be unequal. The functions of the low-pass filters 96, 98 and ac signal generator 100 input to the piezoelectric driver 62, not present in the circuit of FIG. 2 are explained below.

A signal, at frequency f, from the ac signal generator 100 to the piezoelectric driver 62 will cause the position of the adjustable mirror 42 to vary periodically at frequency f. Thus, the path length difference varies periodically causing $\delta$ and $\theta$, since $\theta = \delta + \psi$, to also be periodic functions of time. $\theta(+)$ may be expressed as:

$$\theta(t) = \theta_{dc} + \theta_{ac} \quad (6)$$

where $\theta_{dc}$ is the time average of $\theta(t)$.

The periodic variation of $\theta$ will cause the values of $I_1$ and $I_2$ to be modulated at frequency $f_o$. This modulation of $I_1$ and $I_2$ is critical to the production of the modulated interferometer output signal $S_I$. Therefore, the dc circuit 92 is designed so the ac fluctuations of $I_1$ and $I_2$ are not cancelled by the compensating voltage signal to the adjustable mirror 42. The frequency components of air turbulance in the light path of Mach-Zehnder are concentrated below one kHz. By selecting the ac frequency, f, to be above one kHz and designing the low pass filters 96, 98 to cut off frequency components below one kHz the ac fluctuation of $I_1$ and $I_2$ are isolated from the dc circuit. Thus the dc circuit will only cancel low frequency phase variations due to air currents and will continually adjust the relative path length difference so that $\theta_{dc} = \pi/2$. Eq. (6) thus becomes:

$$\theta(t) = \theta_{dc} + \theta_{ac} = \pi/2 + \theta_{ac} \quad (7)$$

and eq. (5) becomes:

$$S_I = \sin\theta \sin 2\phi = \sin(\pi/2 + \theta_{ac}) \sin 2\phi = \cos(\theta_{ac}) \sin 2\phi. \quad (8)$$

Therefore, the time dependence of $S_I$ depends on the form of $\theta_{ac}$.

The ac circuit of FIG. 3 includes an arithmetic circuit 104 for processing the signals, representing $I_3$ and $I_4$, from the detectors 68, 70 to form a new signal $S_I = (I_3 - I_4)/(I_3 + I_4)$. The noise component of $S_I$ generally has a broad power spectrum. Since the component of $S_I$ carrying the information pertaining to $\Omega$ is modulated, phase-sensitive detection at multiples of twice the modulation frequency will increase the signal-to-noise ratio. To achieve phase-sensitive detection $S_I$ is processed by a phase-locked amplifier 106 to produce the final output signal $S_F$. $S_F$ is measured by standard electronic instruments such as, for example, an oscilloscope. The variation of $I_1$, $I_2$, $I_3$, $I_4$ and $S_I$ for the illustrative case where $\theta$ is pulsed at fixed time intervals is depicted in FIG. 4.

Figure 4A:
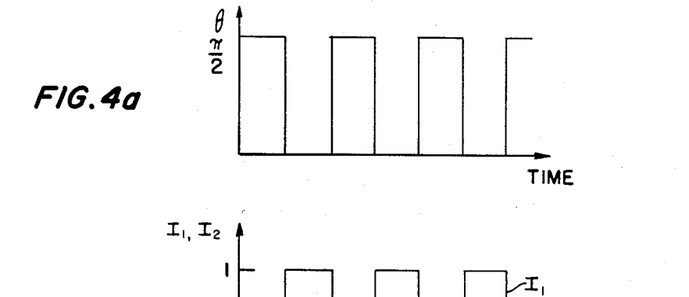
FIG. 4(a) depicts $\theta(t)$ vs. time.
Figures 4B, 4C:
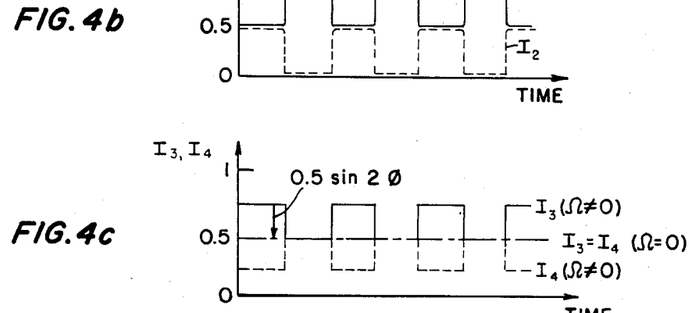
FIG. 4(b) depicts $I_1(t)$ and $I_2(t)$ vs. time.
FIG. 4(c) depicts $I_3(t)$ and $I_4(t)$, for zero and non-zero$\Omega$, vs. time.

FIG. 4 comprises a series of graphs relating to the operation of the present invention when $\theta$ is pulsed. FIG. 4(a) depicts $\theta$ vs. time while 4(b) depicts the corresponding dependence of $I_1$ and $I_2$.

Turning to FIG. 4(b), when $\theta = \pi/2$ the input power is equally divided between the two incident beams, i.e. $I_1 = I_2 = \frac{1}{2}$. However, when $\theta$ is switched to $\theta = 0$ all the power is in the first incident beam, i.e., $I_1 = 1$, $I_2 = 0$.

FIG. 4(c) depicts the values of $I_3$ and $I_4$ for the corresponding values of $\theta$ in FIG. 4(a). Note that when $\Omega = 0$, $I_3 = I_4 = \frac{1}{2}$ for all $\theta$. This follows from eq. (2):

$$I_{3,4} = \frac{1}{2}(1 \pm \sin\theta \sin 2\phi) = \frac{1}{2}$$

since when $\Omega = 0$, $\sin 2\phi = 0$. For non zero $\Omega$, when $\theta = \pi/2$ $$I_{3,4} = \frac{1}{2}(1 \pm \sin 2\phi) = \frac{1}{2} \pm \frac{1}{2}\sin 2\phi,$$

and when $\theta = 0$ $$I_{3,4} = \frac{1}{2}.$$

Thus, when $2\phi$ is near zero, for small rotation rates, the switching of $\theta$ induces a small modulation in the output signal of each detector from the constant value $\frac{1}{2}$, so that the average signal power in each detector is about ½ the input power.

The signal-to-noise ratio of the detector is low for a near zero signal. In the present invention, the average signal power in the detectors may be increased to a level with a high signal-to-noise ratio by adjusting the intensity of the input beam.

Figure 4D:
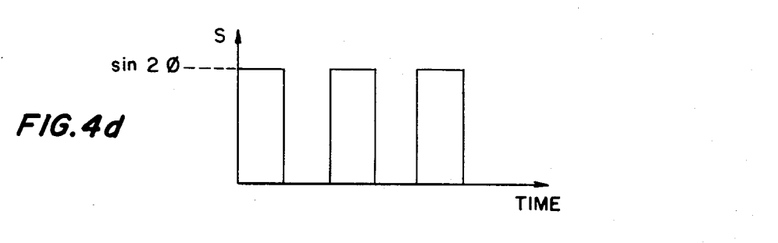
FIG. 4(d) depicts $S(t)$ vs. time.

FIG. 4(d) depicts the value of the interferometer output signal, $S_I$, for the corresponding value of $\theta$ in FIG. 4(a). Note that $S_I$ is modulated between 0 and sin $2\phi$ at the same frequency at which $\theta$ is modulated.

In the embodiment of the invention actually reduced to practice $\theta$ was varied according to:

$$\theta(t) = \theta_{dc} + \theta_{ac} = \pi/2 + \theta_1 \sin 2\pi ft,$$

thus from eq. 2

$$I_{3,4} = \tfrac{1}{2}(1 \pm \cos[\theta_1 \sin 2\pi ft] \sin 2\phi) \quad (9) \text{ or}$$

$$I_3 = \tfrac{1}{2}\{1 = J_0(\theta_1)\sin 2\phi + 2J_2(\theta_1)\cos[2\pi(2f)t]\sin 2\phi + 2 - J_4(\theta_1)\cos[2\pi(4f)t]\sin 2\phi + 2J_6(\theta_1)\cos[2\pi(6f)t-]\sin 2\phi t \ldots \}$$

$$I_4 = \tfrac{1}{2}\{1 - J_0(\theta_1)\sin 2\phi - 2J_2(\theta_1)\cos[2\pi(2f)t]\sin 2\phi - 2 - J_4(\theta_1)\cos[2\pi(4f)t]\sin 2\phi - 2J_6(\theta)\cos[2\pi(6f)t-]\sin 2\phi - \ldots \}$$

where $J_0, J_2, J_4, J_6, \ldots$ are Bessel functions. Thus, modulation products occur at frequencies corresponding to 2Nf, where N is an integer. If phase sensitive detection is chosen to be at 2f, the $J_4$ and higher order terms of the Bessel function expansion of $\cos(\theta_1 \sin 2\pi \, ft)$ may be neglected, so that:

$$I_3 = \tfrac{1}{2}\{1 + J_0(\theta_1)\sin 2\phi + J_2(\theta_1)\cos[2\pi(2f)t]\sin 2\phi\} \quad (10.1)$$

$$I_4 = \tfrac{1}{2}\{1 - J_0(\theta_1)\sin 2\phi - J_2(\theta_1)\cos[2\pi(2f)t]\sin 2\phi\} \quad (10.2)$$

and $$S = J_0(\theta_1)\sin 2\theta + 2J_2(\theta_1)\cos[2\pi(2f)t]\sin 2\phi \quad (11)$$

Note that in this instance the a.c. term depends on $\cos[2\pi(2f)t]$ so that phase sensitive detection is possible at 2f. Of course, as equations 9.1 and 9.2 illustrate, $\theta_1$ may be chosen to permit phase sensitive detection at any desired frequency corresponding to 2Nf, where N is an integer.

Figure 5A:
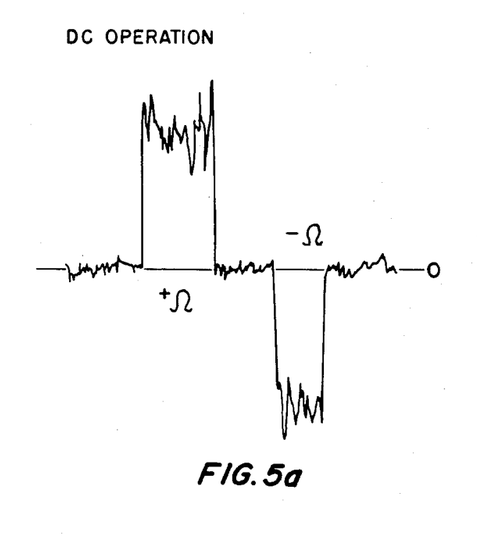
FIG. 5(a) is the output signal for dc operation.
Figure 5B:
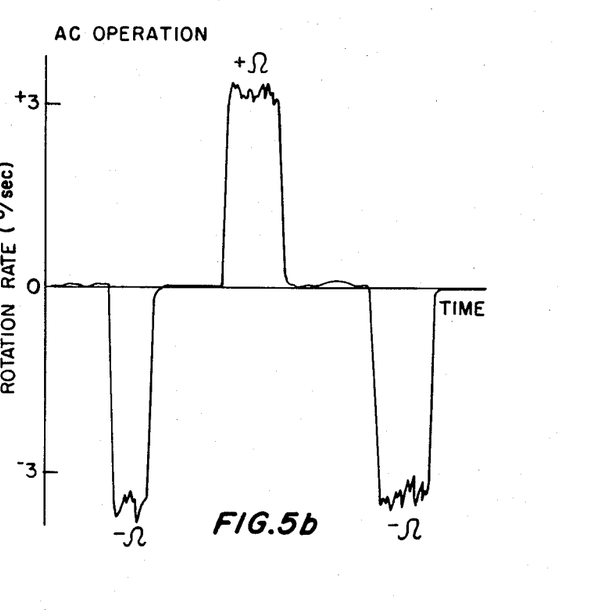
FIG. 5(b) is the output signal for ac operation.

The actual detected signal of the interferometer is depicted in FIG. 5. FIG. 5(a) represents the final output signal, when the interferometer is operated with zero ac signal and FIG. 5(b) represents the final output signal for operation with a non-zero ac signal. Note the dramatic reduction of noise for ac operation.

The fiber length employed was 420 m, the coil diameter was 29 cm and the mirror was driven sinusoidally at 3 kHz with $\theta_1 = 3$ rad. This modulation scheme reduced the short term noise by approximately a factor 10 while allowing the gyroscope to operate at maximum sensitivity.

The arithmetic circuit actually constructed included a Burr Brown 3660 with attendent resistor network for forming the sum of the signals representing $I_3$ and $I_4$, a Fairchild 741 with attendent circuitry for forming the difference, and an ICL 8013 Special Electronic 4 Quadrant Analogue Multiplier for forming the quotient of the difference and the sum of $I_3$ and $I_4$. Phase sensitive detection was accomplished by use of an Ithaco, Model 393 phase-locked amplifier.

It is understood by persons of ordinary skill in the art that the above described embodiment of the invention is not limited to the use of the air-mirror light paths 34,36 in the Mach-Zehnder 12. Alternatively, the Mach-Zehnder 12 could be fabricated on a dielectric substrate with light paths comprising channel waveguides, beamsplitters comprising directional couplers and phase-adjusting means comprising electrodes disposed about a channel waveguide. Discrete optical fibers may also be employed with phase-adjusting means comprising a fiber-stretcher.

The circuit of FIG. 3 would be interconnected with either of the above described Mach-Zehnders in a manner analogous to the Mach-Zehnder depicted in FIG. 2. The ac signal generator 100 would be connected to the phase-shifter and the photodetectors of the ac and dc circuits 92, 94 would be disposed to measure the intensities of the appropriate light beams.

Figure 6:
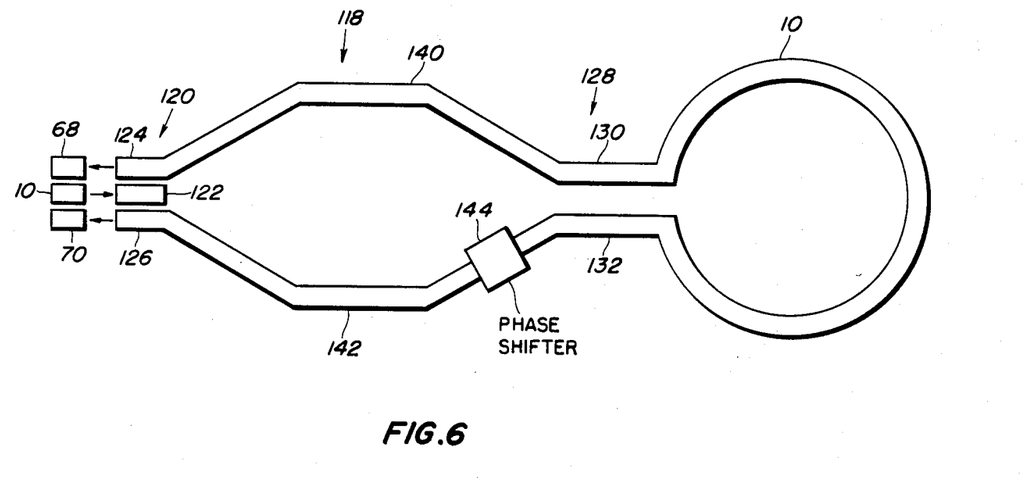
FIG. 6 is a schematic diagram of an embodiment of the present invention wherein the optical coupler comprises a $(3 \times 3) - (2 \times 2)$ optical coupler as disclosed in U.S. patent application Ser. No. 356,590 by Sheem, S. K.
Figure 7:
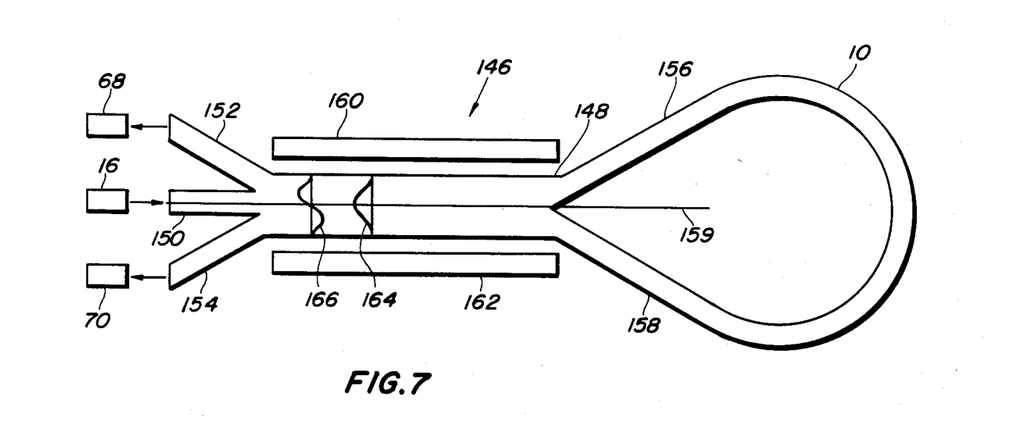
FIG. 7 is a schematic diagram of an embodiment of the invention wherein the optical couplers comprises a $(3 \times 2)$ optical coupler as disclosed in U.S. patent application Ser. No. 353,677, now U.S. Pat. No. 4,445,780, by Burns, W. K.

FIG. 6 depicts an alternate embodiment of the present invention wherein a fiber-optic gyroscope with a $(3\times3)-(2\times2)$ coupler 118, as disclosed by Sheem, K. in U.S. patent application Ser. No. 356,590, is interconnected with the ac circuit depicted in FIG. 3. FIG. 7 depicts a $(3\times3)$ coupler 120 comprising an input waveguide 122 disposed between two first output waveguides 124, 126 and a $(2\times2)$ coupler 128 comprising two second output waveguides 130, 132 wherein the first output waveguides are coupled to the second output waveguides by two intermediate waveguides 140, 142. The waveguides may be channel waveguides fabricated on a dielectric substrate or discrete optical fibers. The second output waveguides 130, 132 are optically coupled to the ends of the optical light path circuit 10, the input waveguide 122 is coupled to an external light source 16 such as a laser, the first output waveguides 124, 126 are coupled to photodetectors 68, 70 and the first output waveguides 124, 126 are coupled to the second output waveguides 130, 132 by the intermediate waveguides 140, 142.

The input beam launched into the input waveguide 122 is split into two light beams which counterpropagate through the optical light path circuit 10 and return to the photodetectors 48, 46 via the second output waveguides 130, 132 the intermediate waveguides 140, 142 and the first output waveguides 124, 126. The intensities of the returning output beams are equal for zero rotation rate due to the symmetry of the $(3\times3)-(2\times2)$ coupler 118. Therefore, the interferometer operates at maximum sensitivity for near-zero rotation rates and only the ac circuit of FIG. 3 is required.

A phase shifter 144, being either a pair of electrodes for channel waveguides or a fiber-stretcher for discrete optical fibers, is disposed across one of the intermediate waveguides 142. An ac signal from the ac signal generator of the circuit depicted in FIG. 3 applied to the phase-shifter 144 will shift the interferometer into and out of quadrature, thereby causing the power of the output signal, $S_I$, to be modulated. Therefore, the interferometer depicted in FIG. 6 controlled by the ac circuit of FIG. 3, wherein the piezoelectric driver and cylinder is replaced by the phase-shifter, provides an ac interferometer output signal, $S_I$, with high average output power. Phase sensitive detection thereof is provided, as set out above, and the noise suppression advantages described above are realized.

FIG. 7 depicts a second alternate embodiment of the present invention wherein a $(3\times2)$ optical coupler 146, as disclosed by Burns in U.S. patent application Ser. No.

353,677, now U.S. Pat. No 4,445,780, is interconnected to the ac circuit depicted in FIG. 3. In FIG. 7 a central two-mode channel waveguide 148 branches at one end into three one-mode input channel waveguides, wherein a middle input waveguide 150 is disposed between two outer input waveguides 152, 154, and at the other end into two one-mode output channel waveguides 156, 158. The output waveguides 156, 158 are optically coupled to the ends of the optical light path circuit 10, the middle input waveguide 150 is optically coupled to an external light source 16 such as a laser, and the outer input waveguides 152, 154 are optically coupled to photodetectors 68, 70. The waveguides of (3×2) coupler 146 are fabricated on the planar surface of a dielectric and are symmetrically disposed about an axis 159 through the central waveguide. Electrode means 160, 162 are disposed relative to the central waveguide 148 for generating an electric field in the central waveguide 148.

The input beam launched into the middle input waveguide 150 is split into two light beams which counter-propagate through the optical light path circuit 10 and return to the photodetectors 48, 50 via output waveguides 156, 158, the central waveguide 148 and the outer input waveguide 152, 154. The intensities of the returning output beam are equal for zero rotation-rate due to the symmetry of the (3×2) coupler 146. Therefore, the interferometer operates at maximum sensitivity for near zero rotation rates so that only the ac circuit of FIG. 3 is required.

FIG. 7 depicts the excitement of the two modes 164, 166 of the central waveguide by the Sagnac phase shifted counterpropagating light beams exiting the optical light path circuit 10. Note that the difference in amplitude of the output signals in the outer input waveguides 152, 154 is due to the interference between the modes at the point where the central waveguide 148 branches into the input waveguides 150, 152, 154. For the phase relationship illustrated in FIG. 7 there is constructive interference in the outer input waveguide 152 positioned above the axis 159 and destructive interference in the outer input waveguide 154 below the axis 159. The output signal $S=(I_3-I_4)/(I_3+I_4)$ is a maximum when the difference between $I_3$ and $I_4$ is a maximum. Thus, S will be maximized if the interference between the modes is a maximum at the branching point.

If $\beta_1$ and $\beta_2$ are the propagation constants of the symmetric and anti-symmetric modes 164, 166, respectively, and L is the length of the central waveguide 148, then interference is maximized when $$(\beta_1-\beta_2)L=\pi/2. \quad (11)$$

and the interferometer operates a quadrature.

A potential difference impressed upon the electrodes 160, 162 creates an electric field across the central waveguide 148. $\beta_1$ and $\beta_2$ are affected differently by the applied electric field since the modes have different transverse intensity distributions. Thus, in the presence of the applied field, $\beta_1$ and $\beta_2$ no longer satisfies eq. (11), interference at the branching point is no longer maximized, and the amplitude of S decreases from its maximum value. The amplitude of S will alternate if an alternating signal from the ac generator of the circuit depicted in FIG. 3 is impressed upon the electrodes. Therefore, the interferometer depicted in FIG. 7 controlled by the ac circuit of FIG. 3 will provide an ac output signal with high average power. Phase-sensitive dection is provided as set out above and the advantages of noise suppression as described above are realized.

Obviously, numerous additional modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A Sagnac rotation-sensing interferometer of the type for use with a light source for providing an input beam to the interferometer and photodetectors for measuring the intensity of the interferometer output beams, said interferometer comprising:
   an optical light path circuit for providing a first and a second output beam with a relative Sagnac phase shift therebetween;
   optical coupling means for dividing the input beam into a first and second incident beam, of intensity $I_1$ and $I_2$ respectively, wherein the first and second incident beams counter-propagate through the optical light path circuit, for dividing the first and second output beams of the optical light path circuit into components and for combining the components to form a third and fourth output beam of intensity $I_3$ and $I_4$ respectively, and for coupling the third and fourth output beams to the photodetectors;
   means for maximizing the sensitivity of the Sagnac interferometer for zero rotation rate so that the interferometer operates at quadrature;
   means for periodically switching the Sagnac interferometer into and out of quadrature so that $I_3$ and $I_4$ are moduated at frequency $f_o$,
   means for phase sensitive detection, of the phase modulated output signals from the photodetectors.

2. The interferometer recited in claim 1 wherein said optical coupler comprises:
   a first light path;
   a second light path wherein said first light path and said second light path have a common terminus;
   first beamsplitting means for splitting the input beam into a first input beam component that propagates through said first light path and a second input beam component that propagates through said second light path;
   second beamsplitting means, positioned at the common terminus of said first light path and said second light path, for splitting the first input beam component into a third input beam component and a fourth input beam component and for splitting said second input beam component into a fifth input beam component and a sixth input beam component wherein said second beamsplitting means is disposed so that the third and fifth input beam component combine to form a first incident beam, of intensity $I_1$, that propagates through said optical light path circuit in a counterclockwise direction and the fourth and sixth input beam components combine to form a second incident beam, of intensity $I_2$, that propagates through said optical light path circuit in a clockwise direction, said second beamsplitting means also for splitting the first output beam of said optical light path circuit into a third output beam component that propagates through said first light path and a fourth output beam component that propagates through said second light path and for splitting the second output beam of said optical light path circuit into fifth output beam component that propagates through said first light path and a sixth output beam component that propagates through said second light path wherein the third and fifth output beam components in said first light path combine to form the third output beam of intensity $I_3$ and the fourth and sixth output beam components in said second light path combine to form the fourth output beam of intensity $I_4$.

3. The Sagnac interferometer recited in claim 2 wherein said maximizing means comprises:
   means for varying the relative phase difference between the input beam components; and
   means for controlling said phase-varying means so that the time averaged intensities of said first and second incident beams, $I_1$ and $I_2$, are equal thereby causing the Sagnac interferometer to operate at quadrature, the maximum sensitivity point, for zero rotation rate.

4. The interferometer recited in claim 3 wherein said first light path comprises:
   a first mirror disposed so that the first input beam component propagating from said first beamsplitter is reflected toward said second beamsplitter; and wherein said second light path comprises:
   a second mirror disposed so that the second input beam component propagating from said first beam splitter is reflected toward said second beamsplitter.

5. The interferometer recited in claim 4 wherein said phase varying means comprises:
   a piezoelectric cylinder attached to said second mirror; and
   a piezoelectric driver for providing a voltage for driving said piezoelectric cylinder thereby varying the path length difference between said first light path and said second light path.

6. The interferometer recited in claim 3 wherein the said first light path of said optical coupler comprises:
   a first discrete single mode optical fiber; wherein said second light path comprises:
   a second discrete single-mode optical fiber; and wherein said phase varying means comprises:
   a optical fiber stretcher with said second optical fiber passing therethrough.

7. The interferometer recited in claim 3 wherein:
   said optical coupler is fabricated on a dielectric substrate; wherein said first light path of said optical coupler comprises:
   a first single-mode channel waveguide fabricated on said substrate; wherein said second light path comprises:
   a second single-mode channel waveguide fabricated on said substrate; and wherein said phase varying means comprises:
   electrode means, disposed relative to said second channel waveguide, for creating an electric field in said second channel waveguide.

8. The interferometer recited in claim 5, 6, or 7 wherein said phase controlling means comprises:
   first detection means for producing a first signal proportional to $I_1$;
   second detection means for producing a second signal proportional to $I_2$;
   means for filtering frequency components above about one KHz from the first and second signals; and
   means for producing a compensating voltage proportional to the difference between the first and second signal and applying the compensating voltage to the phase varying means so that the phase of the second input incident beam component is varied until $I_1 = I_2$.

9. The interferometer recited in claim 8 wherein said means for switching the interferometer into and out of quadrature comprises:
   signal generating means for providing an alternating voltage signal to said phase varying means that modulates the phase of the second input beam component so that $I_3$ and $I_4$ are modulated at frequency $f_o$.

10. The interferometer recited in claim 9 wherein said phase sensitive detection means comprises:
    an arithmetic circuit for electronically processing the output signals of the photodetectors that measure the intensities of interferometer output beams, $I_3$ and $I_4$, to produce the signal $$S_I = (I_3 - I_4)/(I_3 + I_4); \text{ and}$$

phase-locked amplifying means for amplifying a frequency component of $S_I$ corresponding to $2Nf_o$, where N is an integer.

11. The interferometer recited in claim 1 wherein said optical coupler comprises:
    a (3×3) coupler including an input waveguide disposed between two first output waveguides;
    a (2×2) coupler including two second output waveguides; and
    two intermediate waveguides disposed between said (3×3) coupler and said (2×2) coupler wherein said each of said first output waveguides is coupled to one of said second output waveguides by one of said intermediate waveguides; and wherein said means for switching the Sagnac interferometer into and out of quadrature comprises:
    means for varying the phase of a light beam in one of said intermediate waveguides; and
    means for controlling said phase varying means so that the phase of a light beam in one of said intermediate waveguides is periodically varied.

12. The interferometer recited in claim 1 wherein said optical coupler comprises:
    a (3×2) optical coupler including a dielectric substrate, a two-mode channel central waveguide fabricated on said substrate with an input end branching into 3 one-mode input waveguides wherein a central input waveguide is disposed between two outer input waveguides, and with an output end branching into two output waveguides, wherein the middle input waveguide is adapted to launch the input beam into the interferometer, the outer input waveguides are adapted to couple the output beams to the photodetectors, and the output waveguides optically coupled to said optical light path circuit; and wherein said means for switching the Sagnac interferometer into and out of quadrature comprises:
    electrode means, disposed relative to said central waveguide, for creating an electric field within said central waveguide; and means for providing an alternating voltage signal to said electrode means.

13. A Sagnac rotation-sensing interferometer designed to operate at maximum sensitivity for zero rotation rate and to generate an output signal with a high signal-to-noise ratio, said Sagnac interferometer comprising:

optical input means for producing an input beam, an optical light path circuit for producing a first and a second output beams with a Sagnac phase-shift therebetween, depended on the rotation-rate, means for forming the input beam into a first and a second incident beam, of intensity $I_1$ and $I_2$, respectively, wherein the first and second incident beams counter-propagate through said optical light path circuit, experience a relative Sagnac phase shift for a non-zero rotation rate, and exit the optical light path circuit as said first and second output beams, means for equalizing the time averaged intensities of $I_1$ and $I_2$, means for dividing the first and second output beams from said optical light path circuit into components and for combining the components to form a third and a fourth output beam of intensity $I_3$ and $I_4$ wherein $I_3$ and $I_4$ are dependent on the amplitude of the rotation rate, means for modulating the amplitude of $I_3$ and $I_4$ at frequency $f_o$, means for generating a first and a second electrical signals proportional to the modulated amplitudes of $I_3$ and $I_4$ respectively;

means for processing said first and second signals to produce a third signal, $S_1$ wherein $$S_1 = (I_3 - I_4)/(I_3 + I_4);$$

means for phase-sensitive detection of $S_I$, at $2Nf_o$, where N is an integer, to produce a final output signal, $S_F$ whereby the amplitude of $S_F$ is dependent on the rotation rate and $S_F$ exhibits a high signal-to-noise ratio.

14. The interferometer recited in claim 1 wherein said means for phase sensitive detection includes:

phase sensitive detection at 2 $f_o$ of the phase modulated output signals from the photodetectors.

* * * * *